United States Patent
Blagodurov et al.

(10) Patent No.: US 10,055,359 B2
(45) Date of Patent: Aug. 21, 2018

(54) PINNING OBJECTS IN MULTI-LEVEL MEMORY HIERARCHIES

(71) Applicant: Advanced Micro Devices, Inc., Sunnyvale, CA (US)

(72) Inventors: Sergey Blagodurov, Bellevue, WA (US); Gabriel H. Loh, Bellevue, WA (US); John R. Slice, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 170 days.

(21) Appl. No.: 15/040,195

(22) Filed: Feb. 10, 2016

(65) Prior Publication Data
US 2017/0228321 A1    Aug. 10, 2017

(51) Int. Cl.
*G06F 12/00* (2006.01)
*G06F 12/122* (2016.01)
*G06F 3/06* (2006.01)

(52) U.S. Cl.
CPC .......... *G06F 12/122* (2013.01); *G06F 3/0604* (2013.01); *G06F 3/0629* (2013.01); *G06F 3/0653* (2013.01); *G06F 3/0685* (2013.01); *G06F 2212/1016* (2013.01)

(58) Field of Classification Search
CPC ................ G06F 12/122; G06F 3/0653; G06F 2212/1016
USPC .......................................................... 711/117
See application file for complete search history.

(56) References Cited

U.S. PATENT DOCUMENTS

2002/0194432 A1*  12/2002  Rodriguez .......... G06F 12/0897
                                                              711/122

OTHER PUBLICATIONS

Shankland, S., IBM Leaps Two Hurdles for Next-Gen Memory, CNET.com, accessed on the Internet at https://www.cnet.com/news/ibm-leaps-two-hurdles-for-next-gen-memory, published Jun. 29, 2011.
Anthony, S., IBM to build exascale supercomputer for the world's largest, million-antennae telescope, Extremetech.com, accessed on the Internet at http://www.extremetech.com/extreme/124561-ibm-to-build-exascale-supercomputer-for-the-worlds-largest-million-antennae-telescope, published Apr. 2, 2012.
Clark, J., Intel: Non-volatile memory shift means chips need an overhaul, ZDNet.com, accessed on the Internet at http://www.zdnet.com/article/intel-non-volatile-memory-shift-means-chips-need-an-overhaul, published Sep. 13, 2012.
(Continued)

*Primary Examiner* — Jae Yu
(74) *Attorney, Agent, or Firm* — Park, Vaughan, Fleming & Dowler LLP

(57) ABSTRACT

The described embodiments include a computer system having a multi-level memory hierarchy with two or more levels of memory, each level being one of two or more types of memory. The computer system handles storing objects in the multi-level memory hierarchy. During operation, a system runtime in the computer system identifies an object to be stored in the multi-level memory hierarchy. The system runtime then determines, based on one or more attributes of the object, that the object is to be pinned in a level of the multi-level memory hierarchy. The system runtime then pins the object in the level of the multi-level memory hierarchy. In the described embodiments, the pinning includes hard pinning and soft pinning, which are each associated with corresponding retention policies for pinned objects.

20 Claims, 6 Drawing Sheets

(56) References Cited

OTHER PUBLICATIONS

Vetter, J., Blackcomb: Hardware-Software Co-Design for Non-Volatile Memory in Exascale Systems, U.S. Dept. of Energy, accessed on the Internet at http://ft.oml.gov/trac/blackcomb, published Sep. 30, 2013.

* cited by examiner

PINNING OBJECTS IN MULTI-LEVEL MEMORY HIERARCHIES

BACKGROUND

Field

The described embodiments relate to multi-level memory hierarchies. More specifically, the described embodiments relate to techniques for pinning objects in multi-level memory hierarchies.

Related Art

Some computer systems are used for processing large-scale (or "exascale") workloads. To meet memory demands associated with processing large-scale workloads, such computer systems can include two or more levels of memory organized in a multi-level memory hierarchy. In some of these computer systems, some or all of the levels of the multi-level memory hierarchy are implemented using different types of memory (i.e., memory circuits having different architectures, circuit structures, organization, etc.). For example, multi-level memory hierarchies may include some or all of dynamic random access memory (DRAM) or die-stacked DRAM, phase-change memory (PCM), non-volatile memory such as flash, etc. Each type of memory is associated with various characteristics, benefits, and limitations. For example, some types of memory, such as die-stacked DRAM and PCM, enable faster memory accesses, but consume more electrical power, are more expensive, produce more heat, etc. As another example, some types of memory, such as flash memory, are cheaper and more scalable, but provide slower access speeds.

In some cases, objects (data, instructions, etc.) may be stored in levels of multi-level memory hierarchies for which the corresponding type of memory is less than optimal for storing the object. For example, an object that is accessed often may be stored in a slower type of memory—thereby requiring more time for accesses than if the object was stored in a faster type of memory. As another example, an object that takes up a larger amount of space may be stored in a smaller and expensive high-speed type of memory, instead of being stored in a slower, but larger and cheaper type of memory. Because efficient operation of the memory system is an important aspect of the overall operation of computer systems, the storage of objects in multi-level memory hierarchies that include different types of memories is a concern.

BRIEF DESCRIPTION OF THE FIGURES

In the figures, like reference numerals refer to the same figure elements.

DETAILED DESCRIPTION

Figure 1:
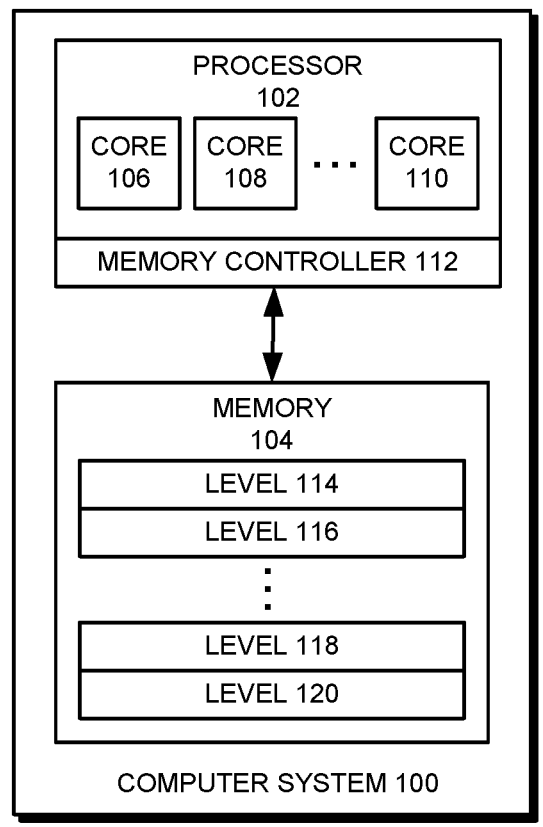
FIG. 1 presents a block diagram illustrating a computer system in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the scope of the described embodiments. Thus, the described embodiments are not limited to the embodiments shown, but are to be accorded the widest scope consistent with the principles and features disclosed herein.

Overview

The described embodiments manage the storage of objects in a multi-level memory hierarchy in a computer system. In these embodiments, "objects" include data, instructions, etc. that are stored in the multi-level memory hierarchy and accessed by hardware entities (controllers, processors, etc.) and/or software entities (software programs, operating systems, etc.). The multi-level memory hierarchy includes a number of "levels" of different types of memory with different characteristics, benefits, and limitations (e.g., access times, power usage, storage size, monetary cost, implementation complexity, etc.). For example, the multi-level memory hierarchy can include two or more of DRAM, stacked DRAM, phase-change memory (PCM), flash memory, etc. arranged in two or more levels. The described embodiments are configured to "pin" objects in corresponding levels of the multi-level memory hierarchy. When "pinning" an object in a level of the multi-level memory hierarchy, a system runtime (e.g., operating system, memory controller, embedded processor, etc.) stores the object in the level of the multi-level memory hierarchy and then retains the object in the level (or not) based on one or more conditions, policies, rules, etc.

In some embodiments, during operation, the system runtime first identifies objects that are to be stored in the multi-level memory hierarchy. The system runtime then determines, based on one or more attributes of, associated with, or relevant to the object, whether the object is to be pinned in a particular level of the multi-level memory hierarchy. In some embodiments, attributes are associated with the object statically and/or dynamically. For example, the one or more attributes of the object may be statically specified for the object during development of a corresponding software program, driver, etc., dynamically determined during runtime of the software program, etc. (where "runtime" means at the time that the software program is executed by a computer system). The one or more attributes may include representations of various properties and characteristics of the object, the computer system, etc. For example, the attributes can include one or more of an annotation for the object, an indication of a particular level of and/or type of memory in the multi-level memory hierarchy to which the object is to be pinned, a frequency of memory access to the object, a memory usage of the object, etc.

In some embodiments, when the system runtime determines that the object is to be pinned in a particular level of the multi-level memory hierarchy, the system runtime determines a type of pinning to be used for the object. For example, the type of pinning may be specified in an annotation and/or determined based on one or more other attributes. In these embodiments, one type of pinning is "hard pinning," in which the object is stored in and then retained (i.e., remains stored in) a specified level of the multi-level memory hierarchy until the object is deallocated or otherwise removed from the multi-level memory hierarchy. Another type of pinning is "soft pinning," in which the object is stored in and remains stored in a specified level of the multi-level memory hierarchy as long as one or more pinning filters for the object are met for/by the object (e.g., by one or more attributes of the object) or until the object is deallocated or otherwise removed from the multi-level memory hierarchy. For example, in some embodiments, for soft pinning, a frequency of accesses of the object in the multi-level memory hierarchy is monitored as an attribute of the object, and the object is stored in, and remains stored in, a corresponding level of the multi-level memory hierarchy based on the frequency of the accesses exceeding (or not exceeding) a specified threshold.

The system runtime then pins the object to a corresponding level of the multi-level memory hierarchy (or does not pin the object). As described above, and depending on the type of pinning for the object, the object remains stored in the corresponding level until the object is removed from the multi-level memory hierarchy, until the object no longer meets the one or more pinning filters, etc. In some embodiments, when the system runtime determines that the object is not to be pinned in the multi-level memory hierarchy, the object may be managed using a default memory-management policy for the computer system.

By pinning objects in levels of the multi-level memory hierarchy as described, the described embodiments enable developers, system runtimes, applications, etc. to more specifically control the locations where objects are stored in the multi-level memory hierarchy. This enables better (faster, lower power, less expensive, etc.) access to objects and generally improves the performance and/or efficiency of the multi-level memory hierarchy without regard as to the particular types of memory in the multi-level memory hierarchy.

Computer System

FIG. 1 presents a block diagram illustrating a computer system 100 in accordance with some embodiments. As can be seen in FIG. 1, computer system 100 includes processor 102 and memory 104. Processor 102 is a functional block that performs computational operations for computer system 100. Processor 102 includes cores 106-110, each of which is a separate functional block that performs computational operations. For example, each of cores 106-110 may include one or more of a central processing unit (CPU), a graphics processing unit (GPU), an embedded processor, an application-specific integrated circuit (ASIC), etc.

Memory 104 is a functional block that stores data and instructions for other functional blocks in computer system 100. Memory 104 comprises memory circuits such DRAM, double data rate (DDR) synchronous dynamic random access memory (SDRAM), PCM, die-stacked DRAM, non-volatile memory (flash, etc.), and/or other types of memory circuits, as well as control circuits for handling accesses of the instructions and data that are stored in the memory circuits. In some embodiments, memory 104 is a main memory in computer system 100. As described in more detail below, memory 104 includes a multi-level memory hierarchy in which objects may be pinned.

Processor 102 includes memory controller 112. Memory controller 112 is a functional block that performs operations for handling interactions between processor 102 and memory 104. For example, memory controller 112 can handle reading data from and writing data to memory 104, control and configure memory circuits in memory 104, handle virtual address to physical address translation, etc.

In some embodiments, one or more communication paths (e.g., buses, wires, and/or other signal routes) are coupled between processor 102 and memory 104, as shown by an arrow-headed line between processor 102 and memory 104. The one or more communication paths are used to transmit commands, data, and/or other information between processor 102 and memory 104. In some embodiments, the communication paths include controllers, processors, adapters, and/or other circuits for handling communications on the communication paths.

Although computer system 100 is described with a particular arrangement of functional blocks, some embodiments include a different number and/or arrangement of functional blocks. For example, some embodiments have multiple processors 102 and/or a different number of cores (as shown by the ellipsis in FIG. 1). Generally, the described embodiments can use any number or arrangement of functional blocks that perform the operations herein described.

Computer system 100 is simplified for illustrative purposes. In some embodiments, computer system 100 includes additional and/or different functional blocks or elements for performing the operations herein described and/or other operations. For example, computer system 100 may include mass storage devices (disks, large non-volatile semiconductor memories, etc.), power subsystems (AC power, batteries, etc.), media processing subsystems, networking subsystems, display subsystems, heating/cooling subsystems, internal communication subsystems (e.g., a northbridge, a southbridge, etc.), peripheral devices, I/O devices, etc.

Computer system 100 can be, or can be included in, any type of electronic device. For example, computer system 100 can be, or can be included in, electronic devices such as desktop computers, laptop computers, wearable computing devices, tablet computers, smart phones, servers, network appliances, toys, audio-visual equipment (stereo receivers, televisions, projectors, set top boxes, etc.), home appliances, vehicles (autos, trucks, airplanes, etc.), industrial controllers, and/or other electronic devices.

Multi-Level Memory Hierarchy

As described above, memory 104 includes a multi-level memory hierarchy with a number of levels, such as levels 114-120 in FIG. 1. Within the multi-level memory hierarchy, two or more of the levels include different types of memory. For example, levels 114-120 may include two or more of stacked DRAM, DRAM, PCM, and/or flash (or another type of non-volatile memory). In these embodiments, each level has the characteristics, benefits, and limitations of the type of memory with which the level is implemented. For example, assuming that level 114 is implemented using stacked DRAM and level 116 is implemented using flash memory, level 114 may be faster to access and have higher bandwidth, but be limited in size due to cost concerns, while level 116 is slower to access, but has more available storage because flash is less expensive than stacked DRAM.

In some embodiments, memory 104 is addressed using a single address space, independently of the particular types of memory used at each level and/or the number of levels. For example, a first portion of a set of addresses in the address space may be directed to (or otherwise associated with) locations in level 114, a second portion of the set of address directed to (or otherwise associated with) locations in level 116, etc. In these embodiments, computer system 100 includes one or more controllers (e.g., memory controller 112, etc.), circuits, etc. for directing memory accesses (reads, writes, etc.) to the corresponding level of the multi-level memory hierarchy based on the associated addresses and other considerations (such as the pinning described herein).

In some embodiments, memory 104 is arranged as a non-uniform memory access (NUMA) design, in which multiple portions of the available memory are associated with and therefore local to different processors (e.g., processor 102) and/or processor cores 106-110 in computer system 100. For example, in some embodiments, two or more processors are mounted in sockets with corresponding memory circuits (e.g., discrete memory chips, on-die memory circuits, etc.) being local to each processor, and with the memory circuits in other sockets being remote to each processor. In these embodiments, a processor may access local memory circuits faster than remote memory circuits.

In some embodiments, the type of memory in which each of the levels multi-level memory hierarchy is implemented depends on projected workload or performance demands, cost and availability of memory devices/functional blocks, etc. For example, in some embodiments, a number of high-speed, high-bandwidth levels maybe increased (e.g., from one to two or more of levels 114-120) when system workload or performance demands warrant the increased cost, power consumption, etc.

Although multi-level memory hierarchy is described using levels 114-120 and particular types of memory, in some embodiments, different numbers and/or arrangements of levels may be used (as shown by the ellipsis in FIG. 1). In addition, the described embodiments may be implemented using other types of memory. Generally, the described embodiments may use any number of levels and/or type of memory for which the operations herein described may be performed.

Pinning Objects in Multi-Level Memory Hierarchies

Figure 2:
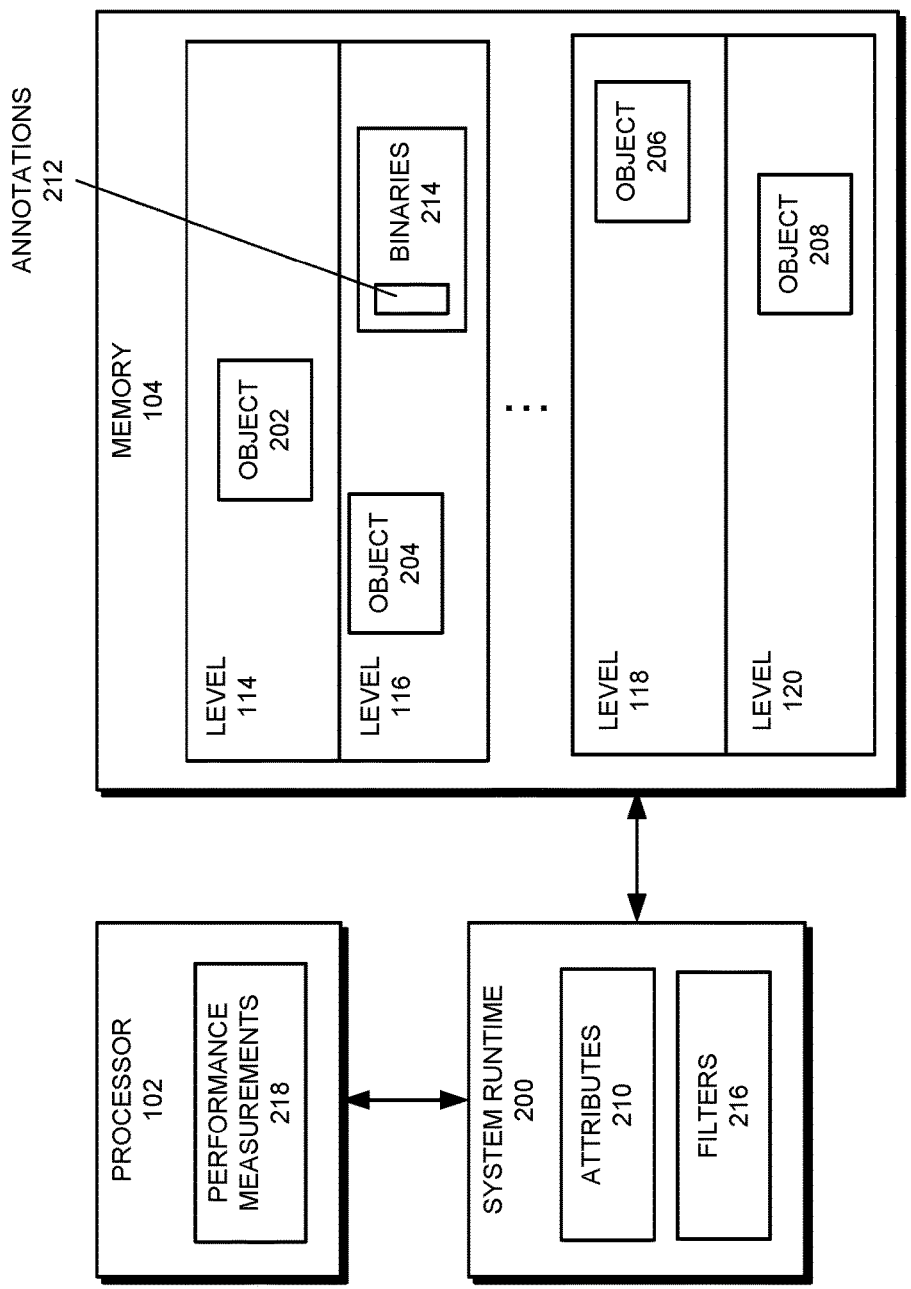
FIG. 2 presents a block diagram illustrating a system for pinning objects in a multi-level memory hierarchy in accordance with some embodiments.

As described above, the described embodiments pin objects in corresponding levels of a multi-level memory hierarchy. FIG. 2 presents a block diagram illustrating a system for pinning objects in a multi-level memory hierarchy in accordance with some embodiments. Note that the "system" shown in FIG. 2 is presented as a general example of a system in some embodiments. Other embodiments include a differently-arranged system, perform different operations, and/or perform operations in a different order. Additionally, although certain mechanisms and entities are used in describing the system (e.g., system runtime 200, objects 202-208, etc.), in some embodiments, other mechanisms and entities perform the operations and/or are used when performing the operations.

As used herein, "object" includes any chunk, block, section, etc. of data or instructions of any size (e.g., one or more bytes, a 4 kB page, a 64 kB block, etc.) that can be stored in memory. In other words, objects such as objects 202-208 can include actual data, instructions, and/or other values or information. In some embodiments, objects include data that is used during the execution of an operating system, a software program or routine, a driver, firmware, microcode, etc. by computer system 100. For example, objects such as objects 202-208 may be instantiated by a software program as an instance of a class and/or other template. A given object, once instantiated, may be stored in memory 104, accessed zero or more times, and eventually deallocated (or otherwise removed) from memory 104 by the software program itself or another entity (e.g., a garbage collector, another software program, a hardware entity, etc.).

As used herein, to "pin" an object in a level of the multi-level memory hierarchy means to store the object in the level of the multi-level memory hierarchy and then to retain the object in the level, possibly based on one or more corresponding filters. For example, objects such as objects 202-208 may be stored in levels of memory 104 for a lifetime of the objects in memory 104 or until the objects fail a pinning filter, as described in more detail below. "Pinning," as used herein, indicates the operation(s) that are performed to pin an object in a level of memory 104.

As shown in FIG. 2, the system includes a system runtime 200. System runtime 200 is generally an entity that performs operations for pinning objects such as objects 202-208 in levels 114-120 in memory 104 (i.e., in a multi-level memory hierarchy). In some embodiments, system runtime 200 includes one or more hardware and/or software entities in computer system 100. For example, in some embodiments, system runtime 200 includes a hardware entity such as a controller (e.g., memory controller 112), a hardware accelerator, a processor core (e.g., one of processor cores 106-110), an embedded processor, etc. As another example, in some embodiments, system runtime 200 includes a software entity such as an operating system, a device driver, and/or a software program executed by computer system 100 (e.g., by processor 102). System runtime 200 is shown as a separate block in FIG. 2 for illustrative purposes, but in some embodiments, some or all of system runtime 200 is included in another block.

In some embodiments, when pinning objects such as objects 202-208 in levels 114-120, system runtime 200 performs the pinning based on attributes 210 associated with the objects. Attributes 210 generally include data, information, indicators, etc. that are included in, determined for, or otherwise associated with corresponding objects that can be used to determine a level in which a corresponding object is to be pinned (or not). In some embodiments, the attributes include static attributes and dynamic attributes. One difference between static attributes and dynamic attributes is when the attributes are specified, made available, determined, etc. Generally, static attributes are specified in advance of the object being used, instantiated, generated, etc. at runtime, and dynamic attributes are determined, calculated, acquired, etc. at runtime. As used herein, "runtime" means a time during the operation of a computer system following a boot-up operation, a time when a software program is executed by a computer system, etc. In some embodiments, static attributes are attributes specified by a developer (e.g., by using a corresponding function call, an annotation statement, etc. in program code), a compiler, a software program (code optimizer, etc.), etc., as program code for a software program that creates objects is being developed or updated (written, compiled, optimized, patched, etc.). In these embodiments, the attributes may be incorporated in binaries that include the objects (e.g., binaries 214), executable program code for software programs, etc. In some embodiments, dynamic attributes are determined based on runtime conditions for the objects such as properties or characteristics of objects themselves (e.g., size, number or rate of accesses, changes in the object, type of the object, etc.), properties or characteristics of computer system 100 (e.g., operating mode, power consumption, temperature, etc.), properties or characteristics of one or more of levels 114-120 (e.g., type of memory, business, available space), etc. Dynamic attributes may be acquired, determined, kept or maintained, etc. by a software program that created the object, by another software program, operating system, device driver, etc., by a hardware entity (processor 102, etc.), and/or by another mechanism.

In some embodiments, attributes 210 include annotations 212 that are included in and/or otherwise associated with some or all of the corresponding objects. In some embodiments, annotations 212 include indications that the corresponding object should be pinned in memory 104. For example, annotations 212 may include data such as one or more indicator bits or another value or values that indicate, to system runtime 200, that the object is to be pinned in memory 104. In addition, annotations 212 may indicate a particular level of memory 104 to which the object should be pinned. Alternatively, annotations 212 may indicate a type of memory into which the object should be pinned, if possible, and may not indicate a particular level. In some embodiments, annotations are included in binaries 214 for objects, as shown in FIG. 2. However, in some embodiments, annotations may be included in and acquired from other locations (e.g., an object annotation database, within program code, etc.).

As described above, in some embodiments, developers may associate annotations with corresponding objects in program code (or "manually" associate the annotations with the objects). In order to assist a developer with selecting objects for annotating, an integrated development (IDE) may be used to provide information about objects to the developer. For example, the IDE may include a tool suite that provides debugging, processor profiling, power profiling, and/or kernel analysis capabilities. The IDE may aggregate and provide performance metrics and information about issues associated with objects to the developer, thus allowing the developer to identify objects that are suitable for pinning to particular levels of memory 104. For example, a profiler in the IDE may identify a pre-specified number of objects with the highest or lowest frequency of access and/or objects for which the sizes (in bytes, megabytes, etc.) do not exceed threshold sizes for one or more levels of memory 104. In some embodiments, the IDE presents a chart or other display of the identified objects along with the sizes and locations of the objects in the software program. The developer may use the chart and/or other information from the IDE to annotate frequently accessed or smaller objects for pinning to faster levels of memory 104, to annotate infrequently accessed or bigger objects for pinning to slower levels memory 104, etc.

Although developers may manually annotate objects as described, annotating objects manually may be impractical for programs with larger numbers of objects. Thus, as described above, to reduce the overhead associated with annotating large numbers of objects, in some embodiments, a compiler (and/or another hardware or software entity) automatically annotates at least some of the objects. In some of these embodiments, one or more rules (or guidelines, conditions, etc.) are used by the compiler when determining objects to be annotated and/or how to annotate objects. The rules include thresholds and/or other criteria that are used to determine how objects are to be annotated. In these embodiments, while analyzing objects during an annotation operation, the compiler compares characteristics and properties of the objects to the rules to determine objects to be annotated and/or how to annotate for the objects. The rules may be provided by the developer, received from another software program, created by the compiler itself, etc. For example, the developer may specify, as rules, object sizes and/or frequencies of access that are used by the compiler to determine which and/or how objects are to be annotated (and thus pinned to corresponding levels of the memory 104). As another example, the compiler may statically or dynamically analyze the behavior of the software program and automatically generate some or all of the rules and/or annotations based on properties and characteristics (e.g., sizes, speeds, frequency of access) of the objects or computer systems on which the compiled program code is to execute, etc. In some embodiments, the compiler adds the annotations to binaries 214 for the objects.

In some embodiments, the compiler creates multiple binaries 214 of a software program, each binary containing a unique set of annotations for objects, the binaries optimized for different use cases, multi-level memory hierarchies (i.e., multi-level memory hierarchy including different numbers of levels, different types of memory, etc.), and/or architectures under which the software program can be executed. In these embodiments, an executing computer system may select from one of the binaries based on runtime conditions, system architecture, etc. so that a "best" binary is executed for the runtime conditions, system architecture, etc.

In some embodiments, annotating objects includes performing a combination of manual and automated annotation of objects. For example, the developer may manually annotate a number of objects in source code, and the compiler (and/or another software program or hardware entity) may automatically annotate other objects. For instance, in some embodiments, a developer manually annotates a small number of objects and the compiler automatically annotates other objects (and possibly a large number of other objects) with similar characteristics (e.g., structure, name, type, size, etc.) based at least in part on the manually annotated objects. In these embodiments, the developer may use a small number of annotations to "customize" pinning of objects in memory 104.

Returning to FIG. 2, after binaries 214 are created by the compiler (e.g., after automatic and/or manual annotation of objects), binaries 214 may be executed by processor 102. When the binaries are executed, objects 202-208 associated with binaries 214 are generated, instantiated, etc. and may be pinned or otherwise stored in the multi-level memory hierarchy based on the annotations 212. At runtime, annotations 212 are provided to system runtime 200. For example, in some embodiments, system runtime 200 may use a system call to obtain annotations 212 while a corresponding software program executes on processor 102. In some embodiments, however, system runtime 200 analyzes binaries 214 of objects 202-208 to identify annotations 212, independently of the execution of the software program on processor 102.

In some embodiments, when an object lacks an annotation and/or other attribute that identifies the object as an object that is to be pinned in memory 104, system runtime 200 omits pinning the object in memory 104 (i.e., does not pin the object in memory 104). In some of these embodiments, system runtime 200 instead manages the object using a memory-management policy for computer system 100. In other words, these objects are not pinned in memory 104, but instead are managed using another memory management policy (i.e., mechanism, technique, etc.). For example, system runtime 200 and/or another component of computer system 100 may use a Level of Memory Closest to the Accessing Core (LMCAC) policy to manage such objects and other unpinned objects as part of a common pool of memory 104.

As described above, in the described embodiments, objects may be "hard" pinned and "soft" pinned in memory 104. For hard pinning, an object is stored and retained in (i.e., remains stored in) a specified level of memory 104 until the object is deallocated or otherwise removed from memory 104. For example, an annotation for the object may indicate that the object is to be hard pinned in a certain level of memory 104, in a certain type of memory, etc. System runtime 200 may therefore store and retain the object in a corresponding level of memory 104 during the object's existence or lifetime.

For soft pinning, an object is pinned to a certain level of the multi-level memory hierarchy as long as one or more filters 216 for the object are met by or for one or more attributes 210 of the object, or until the object is deallocated or otherwise removed from memory 104. For example, the filters 216 may include thresholds and/or criteria relating to object properties or characteristics (size, number of accesses, type, etc.), properties or characteristics of computer system 100 (temperature, business, memory bandwidth, operating mode, etc.), and/or other thresholds and criteria. In other words, the object may (or may not) be initially stored in and retained in a particular level of memory 104 based at least in part on one or more attributes associated with the object exceeding corresponding thresholds, criteria, etc. of filters 216. In some embodiments, a hard pinned or soft pinned object (i.e., a portion of memory 104 occupied by the object) is excluded from other memory-management policies or schemes to avoid the object being removed from the level of memory 104 in which the object is pinned.

In some embodiments, filters 216 are updated, adjusted, etc. during runtime of computer system 100. For example, a filter 216 based on a threshold for a number of accesses and/or size of an object may be increased or decreased at runtime by computer system 100, system runtime 200, one or more software programs, hardware entities, etc. to control the pinning of objects in memory 104. In these embodiments, by adjusting filters 216 at runtime, control of how objects are pinned (or not) in memory 104 based on various runtime conditions can be had. For example, if a thermal condition, performance level, etc. is below a threshold, one or more filters 216 can be adjusted to control how objects are pinned in memory 104 to affect the thermal condition, performance level, etc.

System runtime 200 may calculate or otherwise determine attributes 210 during runtime of the software program, e.g., as the software program that created an object is executing. Such runtime attributes 210 may be calculated based at least in part on performance measurements 218 for the object. For example, system runtime 200 may use a system call and/or other communication mechanism to obtain performance measurements 218 from model-specific registers (MSRs) of processor 102, an operating system of computer system 100, and/or another source. System runtime 200 may then directly use performance measurements 218 as runtime attributes 210 for the object or otherwise determine runtime attributes 210 based on performance measurements 218. Note that performance measurements 218 are shown as part of processor 102 for illustrative purposes, however, performance measurements 218 may be located elsewhere in computer system 100.

In some embodiments, the above-described runtime attributes 210 include a frequency of memory accesses of an object. In some embodiments, the frequency of access is determined by dividing the number of memory accesses to the object by the total number of memory accesses in the software program and/or memory 104. In some of these embodiments, data, L2, and/or instruction cache miss records from the MSR space of processor 102 or elsewhere are used for the determination. In some embodiments, the frequency of access is determined by dividing the number of minor page faults associated with the object by the total number of minor page faults in the software program and/or memory 104. In some of these embodiments, page fault information is obtained from the operating system on computer system 100, e.g., from page-related data structures in the operating system.

In some embodiments, the above-described runtime attributes 210 include a memory usage of an object. A value for the memory usage may be calculated by dividing a size of the object (e.g., in bytes, blocks, etc.) by a size of the level of memory 104 to which the object is to be pinned. In some of these embodiments, memory usage information may be obtained using system calls and/or profiling tools.

In some embodiments, the above-described runtime attributes 210 relate to "physical effects" of pinning the object in computer system 100 (i.e., relate to properties and characteristics of computer system 100). For example, runtime attributes 210 may include thermal conditions (temperatures) and/or power consumption values, and/or other physical attributes 210. In some embodiments, physical attributes 210 are measured using corresponding sensors (e.g., thermometers, power sensors, etc.) in memory 104 or elsewhere in computer system 100. In some embodiments, the physical attributes 210 are approximated, estimated, etc. based on performance measurements 218 such as operational activity (memory transfer rate, etc.), etc. For example, the power consumption associated with storing and accessing an object may be used to estimate an increase in temperature for a given level of memory (perhaps in consideration of storing and accessing a specified number of similar objects).

In some embodiments, the above-described runtime attributes 210 and/or other attributes 210 are used in combination. For example, a frequency of access for an object may be combined with (e.g., divided by, concatenated to, etc.) a memory usage for the object to determine a composite attribute (or "pinning score"). As another example, the runtime attributes 210 may include metrics that characterize other effects (e.g., latencies, bandwidths, bugs, security, etc.) of pinning the object to various levels of memory 104.

As described above, filters 216 may include thresholds and/or other criteria that should be met by the runtime attributes 210 in order for a pinned object to be retained in a given level of memory 104 (i.e., for soft pinning). For example, in some embodiments, filters 216 indicate a frequency of access and/or size of the object to be used to determine whether an object is to be retained in a faster, smaller, etc. level of memory 104. As another example, in some embodiments, filters 216 indicate that an object is to be pinned in a given level of memory 104 as long as the temperature and/or power consumption associated with the pinned object does not exceed a threshold.

When filters 216 are met, system runtime 200 pins the object in a corresponding level of memory 104. When filters 216 are not met, system runtime 200 omits newly or initially pinning the object in a level of memory 104. By "omitting" pinning the object, system runtime 200 does not store the object in a given level in memory 104 and then retain the object in the level of memory based on the particular type of pinning. Note, however, that the object, even when not pinned, may still be stored in any level of memory—the object is, however, not retained in a level of memory as pinned objects are. In some embodiments, as described above, objects that are not pinned in the memory are managed using a default memory-management policy for computer system 100.

In the described embodiments, system runtime 200 (and/or another entity) periodically determines whether soft pinned objects meet one or more corresponding filters 216. For example, system runtime 200 may determine whether a soft pinned object meets the one or more corresponding filters every N microseconds (where N is a numerical value), each time a predetermined event occurs, etc. When a soft pinned object does not meet a corresponding filter 216, system runtime 200 unpins the object from a corresponding level in memory 104. For example, if an object has a filter 216 relating to a size of the object (e.g., a maximum size, a minimum size, a maximum/minimum change in size, etc.), system runtime 200 may unpin the object when the size of the object no longer meets the filter 216. When an object is unpinned, the object may be subsequently managed using the default memory-management policy, pinned in another level of the memory, and/or otherwise handled by system runtime 200. In some embodiments, unpinning an object does not necessarily mean that the object is immediately removed from a level in memory 104 in which the object was previously pinned, but simply that the object is no longer retained in the level of memory 104 as pinned objects are.

To account for the presence of pinned objects such as objects 202-208 in memory 104, system runtime 200 may adjust (and possibly re-adjust) the total memory 104 available for use by the default memory-management policy by an amount proportional to an amount of memory occupied by pinned objects. For example, system runtime 200 may use a "resize" call to update the size of the memory pool used in managing unpinned objects when one or more objects are pinned to memory 104 or unpinned from memory 104. In some embodiments, the adjustment may account for possible future increases in size of pinned objects. In other words, the amount "proportional" to the size of a pinned object may be larger than the pinned object.

In some embodiments, system runtime 200 and/or another component of computer system 100 separately tracks performance measurements 218 (e.g., frequency of access, size, thermal effects, etc.) for one or both of pinned and unpinned objects. Performance measurements 218 for the pinned objects may then be used to update runtime attributes 210 of the pinned objects 202-208 and manage pinning or unpinning of the objects based on attributes 210 and filters 216. In some embodiments, attributes 210 are calculated based on performance measurements 218 for pinned objects 202-208 alone, and pinning decisions by system runtime 200 are unaffected by the behavior or management of unpinned objects in memory 104. In some embodiments, however, the performance measurements for both pinned and unpinned objects are aggregated into cumulative runtime statistics for the software program and/or memory 104.

By pinning objects 202-208 to levels 114-120 of memory 104 based on attributes 210, annotations 212, performance measurements 218, and filters 216, the system of FIG. 2 may improve performance over computer systems that do not perform attribute-based pinning of objects in memory systems with multi-level memory hierarchies. Moreover, because such pinning may be based on both development and runtime attributes 210, the behavior of the system may be adapted to and updated for different memory technologies, runtime conditions, computer architectures, and/or software programs.

Although objects are described above as having annotations 212, in some embodiments, at least some pinned and/or unpinned objects do not have annotations 212. For example, in some embodiments, only objects that are statically amended during a compilation step, are part of a particular group of objects, etc. have annotations 212. In addition, in some embodiments, attributes 210 are not determined for at least some pinned and/or unpinned objects. In these embodiments, it is not necessary for every pinned and/or unpinned object to have attributes determined for the object.

Pinning Objects in a Multi-Level Memory Hierarchy

Figure 3:
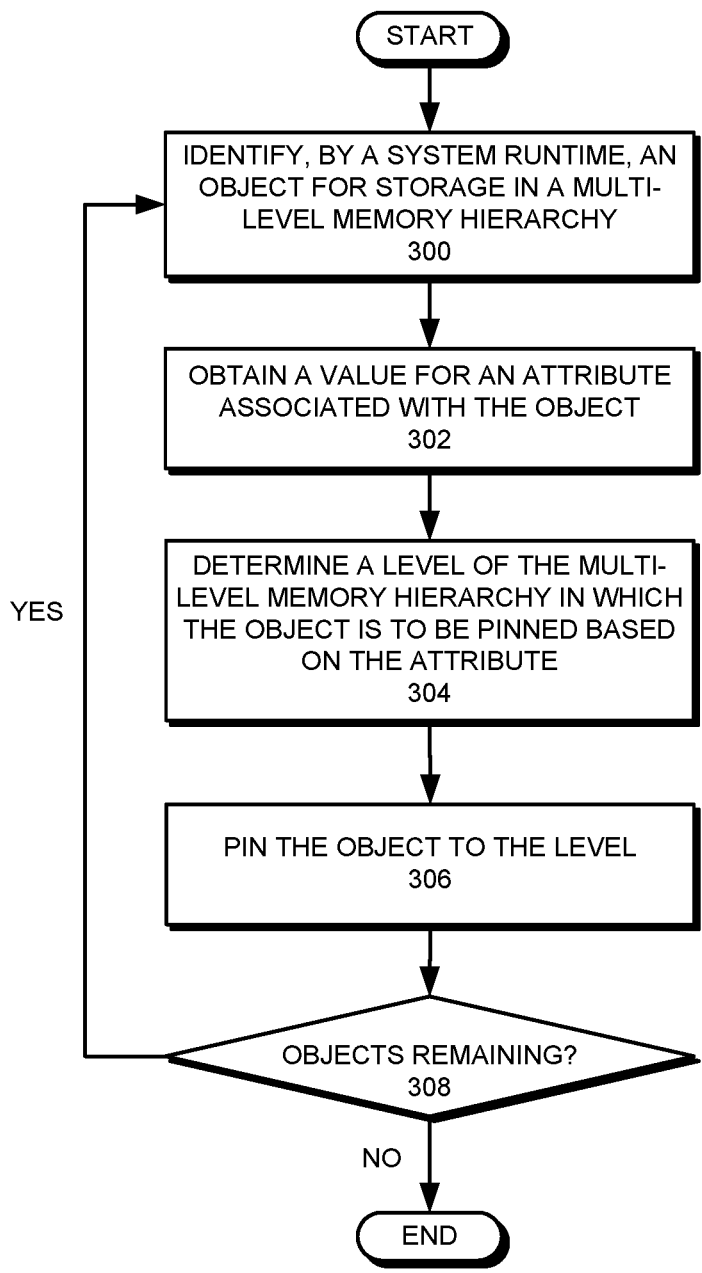
FIG. 3 presents a flowchart illustrating a process for pinning objects in a multi-level memory hierarchy in accordance with some embodiments.

FIG. 3 presents a flowchart illustrating a process for pinning objects in a multi-level memory hierarchy in accordance with some embodiments. The operations shown in FIG. 3 are presented as a general example of operations performed by some embodiments. The operations performed by other embodiments include different operations and/or operations that are performed in a different order. Additionally, although certain mechanisms and entities are used in describing the operations (e.g., system runtime 200, etc.), in some embodiments, other mechanisms and entities may perform the operations. Also, references to a multi-level memory hierarchy in the description of FIG. 3 refer to a multi-level memory hierarchy such as levels 114-120 of memory 104.

As shown in FIG. 3, the process starts when system runtime 200 identifies an object (e.g., one of objects 202-208) for storage in a multi-level memory hierarchy (step 300). For example, system runtime 200 may identify an object that is being used during execution of a software program on computer system 100. The object may therefore be instantiated by the software program, accessed zero or more times by the software program and/or other software or hardware entities on computer system 100, and deallocated or otherwise deleted from memory 104 by the software program or another software or hardware entity.

System runtime 200 next obtains a value for an attribute associated with the object (step 302). As described above, the attribute may be specified before runtime of the software program (e.g., during development of the software program) and/or determined during runtime of the software program. For example, the attribute may include an annotation for the object, a record of a number of memory accesses to the object or levels of the multi-level memory hierarchy, a memory usage/size of the object, a property or characteristic of computer system 100, a property or characteristic of the software program, a runtime condition, etc.

System runtime 200 then determines a level of the multi-level memory hierarchy to which the object is to be pinned based on the attribute (step 304), as described in further detail below with respect to FIGS. 4 and 5A-5B. System runtime 200 next pins the object in the level in the multi-level memory hierarchy (step 308). As described herein, this operation may include hard pinning or soft pinning the object in the level of the multi-level memory hierarchy.

For the example in FIG. 3, it is assumed that the attribute associated with the object exists and indicates that object is to be pinned in the multi-level memory hierarchy. If the object is not to be pinned, pinning is omitted as described herein.

System runtime 200 then performs the above-described pinning operation for zero or more remaining objects (step 308). More specifically, system runtime 200 identifies each object to be stored in the multi-level memory hierarchy (step 300), obtains a value for the attribute of the object (step 302), determines the level to which the object is to be pinned based on the attribute (step 304), and pins the object to the level (step 306).

In some embodiments, system runtime 200 repeatedly performs some or all of operations 302-308 (or similar operations) to manage objects in the multi-level memory hierarchy during runtime of the software program and/or computer system 100. In some of these embodiments, system runtime 200 performs these operations to determine if the soft pinned objects are to remain pinned (i.e., be retained) in a particular level of memory hierarchy. For example, in some embodiments, system runtime 200 periodically performs operations 304-308 (or similar operations) or performs operations 304-308 (or similar operations) each time one or more specified events occurs (e.g., creation or deallocation of one or more objects, available memory reaches a threshold, operating mode changes, temperature and/or access rate threshold reached for one or more levels of memory, a request is received to evaluate objects for pinning/unpinning, etc.).

By performing the operations described herein, the described embodiments are able to pin objects to particular levels of a multi-level memory hierarchy in order to improve the operation of the multi-level memory hierarchy and, more generally, computer system 100. For example, in some embodiments, larger or less frequently accessed objects may be pinned in slower but larger and cheaper levels of memory, and smaller or more frequently accessed objects may be pinned in faster, but smaller and more expensive levels of memory. As another example, a level of activity (i.e., business), temperature, latency, bandwidth, available space, etc. of a particular level of memory may be taken into account when determining if objects are to be pinned or remain pinned in the particular level of memory. As yet another example, a property or characteristic of computer system 100 (e.g., low or high power operating mode, high security operating mode, business, temperature, etc.) may be taken into account when determining levels in the memory in which objects are pinned.

Hard Pinning an Object in a Level of a Multi-Level Memory Hierarchy

Figure 4:
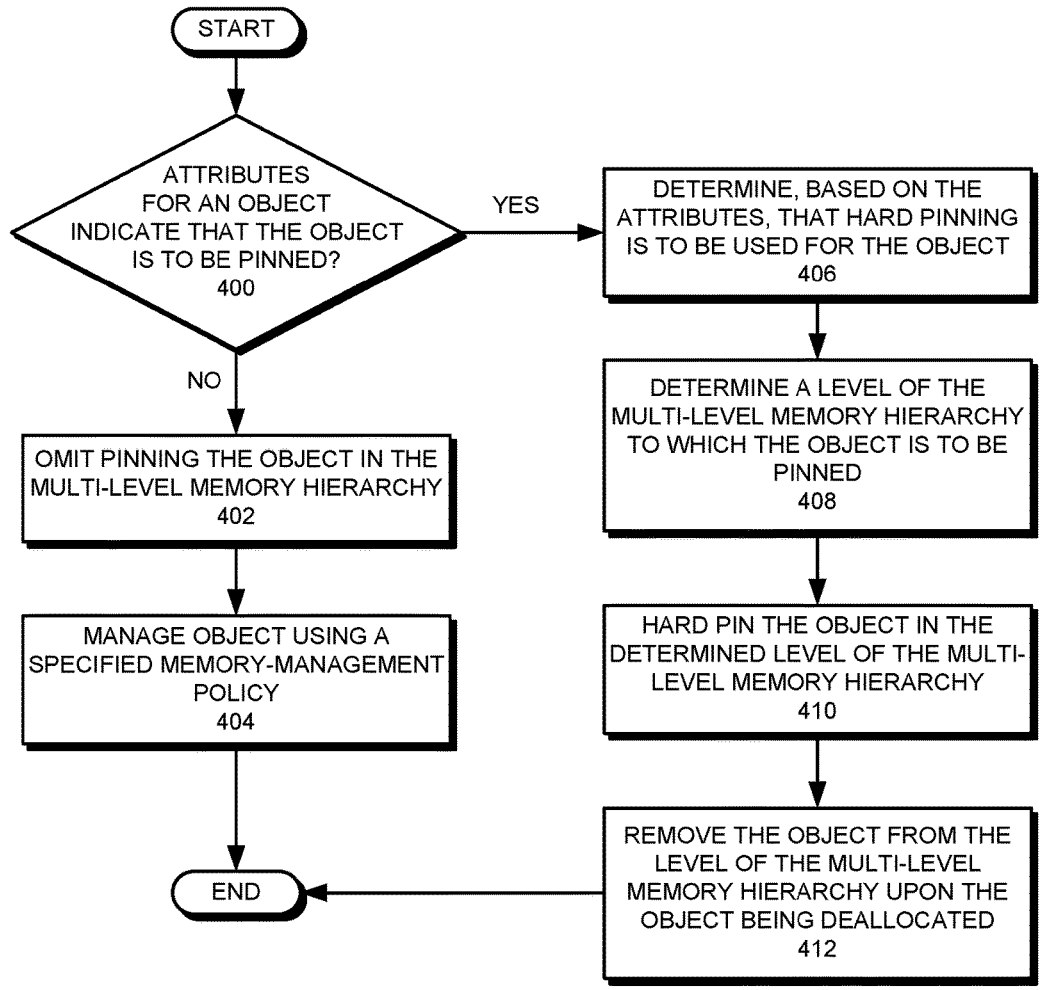
FIG. 4 presents a flowchart illustrating a process for hard pinning an object in a level of a multi-level memory hierarchy in accordance with some embodiments.

FIG. 4 presents a flowchart illustrating a process for hard pinning an object in a level of a multi-level memory hierarchy in accordance with some embodiments. The operations shown in FIG. 4 are presented as a general example of operations performed by some embodiments. The operations performed by other embodiments include different operations and/or operations that are performed in a different order. Additionally, although certain mechanisms and entities are used in describing the operations (e.g., system runtime 200, etc.), in some embodiments, other mechanisms and entities may perform the operations. Also, references to a multi-level memory hierarchy in the following description refer to a multi-level memory hierarchy such as levels 114-120 of memory 104.

As shown in FIG. 4, system runtime 200 first determines whether one or more attributes of an object (e.g., included in the object, associated with the object, relevant to the object, etc.) indicate that the object is to be pinned in the multi-level memory hierarchy (step 400). For example, in some embodiments, system runtime 200 may acquire, as an attribute, an annotation for the object that indicates that the object is to be pinned in the multi-level memory hierarchy. In these embodiments, the annotation can include one or more values (represented by, e.g., one or more bits) that indicate, to system runtime 200, that the object is to be pinned in the multi-level memory hierarchy. In some of these embodiments, the annotation is statically added to the object—such as when a developer adds an annotation to the object. As another example, one or more attributes associated with the object (and/or with the multi-level memory hierarchy, computer system 100, a software program that created the object etc.) may be acquired, computed, determined, etc. by system runtime 200. For instance, an attribute representing a size of the object, an operating mode of computer system 100, an attribute representing a level of activity (i.e., business) and/or a size of one or more levels of memory, etc. may be acquired from corresponding hardware or software sources in computer system 100 and directly or indirectly used as attribute(s) for determining whether the object is to be pinned in the multi-level memory hierarchy.

When an attribute is not present and/or does not indicate that the object is to be pinned in the multi-level memory hierarchy, system runtime 200 omits pinning of the object to a level of the multi-level memory hierarchy (step 402). In this case, the object may be stored in any level of the multi-level memory hierarchy, but is not retained in a particular level of the multi-level memory hierarchy, and system runtime (or another entity) may manage the object using a specified (e.g., default) memory-management policy for computer system 100 (step 404). For example, system runtime 200 and/or another entity may use an LMCAC policy to manage the object, along with other unpinned objects in memory 104.

When one or more attributes are present (or can be acquired, determined, etc.), system runtime 200 determines, based on the one or more attributes, that hard pinning is to be used for the object (step 406). For example, an annotation for the object and/or another acquired, determined, computed, etc. attribute may be used to directly or indirectly determine that the object is to be hard pinned in the multi-level memory hierarchy. For instance, a particular value in an annotation and/or one or more attributes exceeding corresponding filters may indicate to system runtime 200 that the object is to be hard pinned. (For the example in FIG. 4, it is assumed that the attributes indicate that hard pinning is to be used for the object.)

System runtime 200 then determines a level of the multi-level memory hierarchy to which the object is to be pinned (step 408). For example, system runtime 200 may determine the level based on an annotation for the object. As another example, system runtime 200 may determine the level based at least in part on attributes other than an annotation, such as a size of the object, an operating mode of computer system 100, a business and/or a size of one or more levels of memory, etc. Generally, during operation 408, system runtime 200 determines, based on one or more factors, characteristics, properties, etc., of the object, computer system 100, etc., a level of the multi-level memory hierarchy in which the object is to be pinned.

System runtime 200 then hard pins the object to the determined level of the memory hierarchy (step 410). In the described embodiments, hard pinning the object includes storing the object in a location in the determined level of the multi-level memory hierarchy and then retaining the object in the level until the object is deallocated or otherwise removed from the multi-level memory hierarchy. In this way, for a lifetime of the object, the object is retained in the determined level of the multi-level memory hierarchy. The storing operation generally includes requesting allocation of or otherwise determining an available location in the determined level of the multi-level memory hierarchy (e.g., requesting allocation of one or more free contiguous or non-contiguous blocks of memory) and then storing the object in the available location. Retaining the object generally includes providing access to the object in the determined level of the multi-level memory hierarchy, but preventing the object from being moved to other levels of the multi-level memory hierarchy during the object's lifetime. For example, reads, modifications, writes, etc. of the object are permitted and performed normally on the object in the level of the multi-level memory hierarchy in which the object is pinned, but the object is not removed from the level of the multi-level memory hierarchy.

Upon determining that the object has been deallocated (or is otherwise to be removed from the multi-level memory hierarchy), system runtime 200 removes the object from the level of the multi-level memory hierarchy (step 412).

Soft Pinning an Object in a Level of a Multi-Level Memory Hierarchy

Figure 5A:
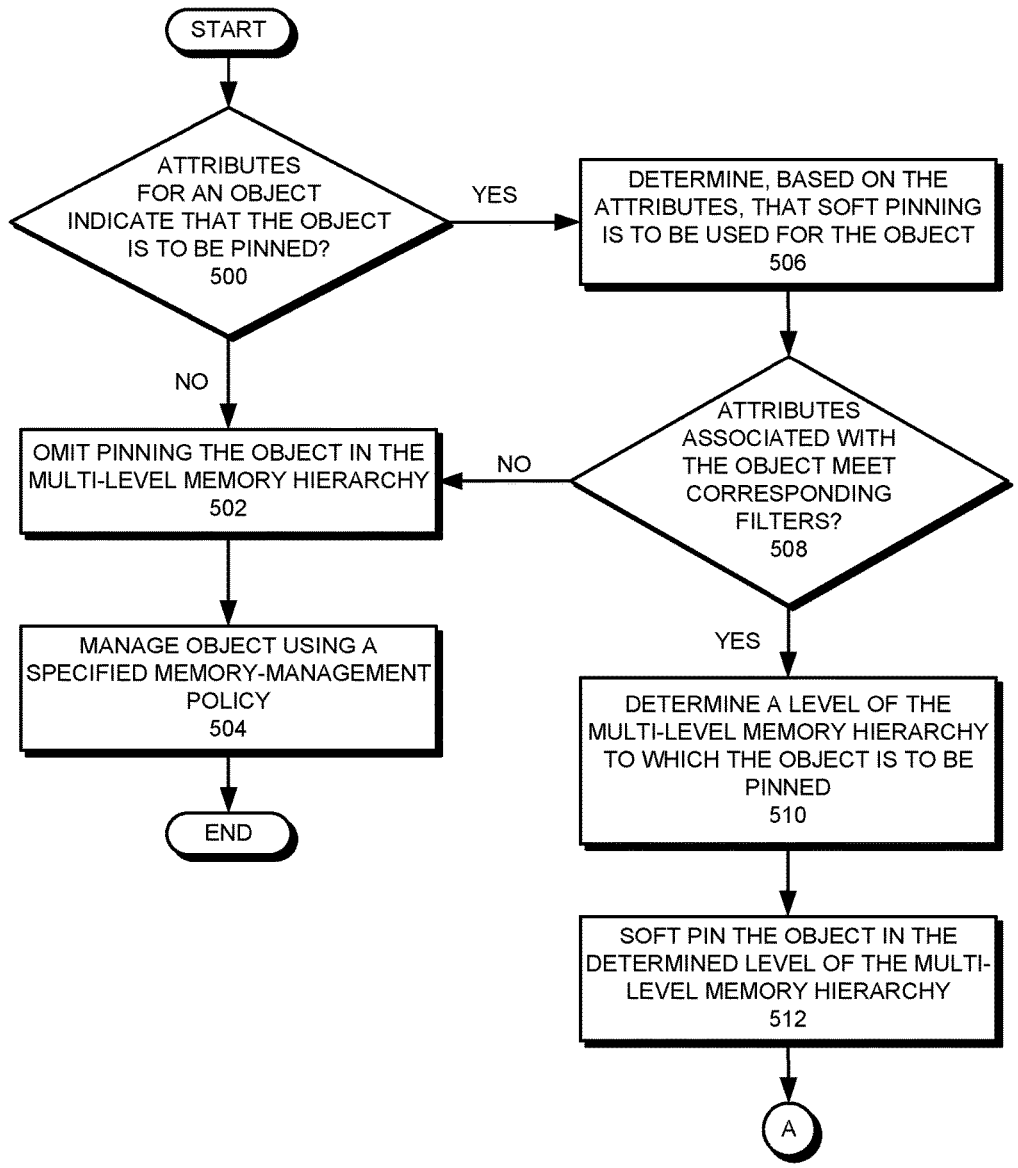
FIG. 5A presents a flowchart illustrating a process for soft pinning an object in a level of a multi-level memory hierarchy in accordance with some embodiments.
Figure 5B:
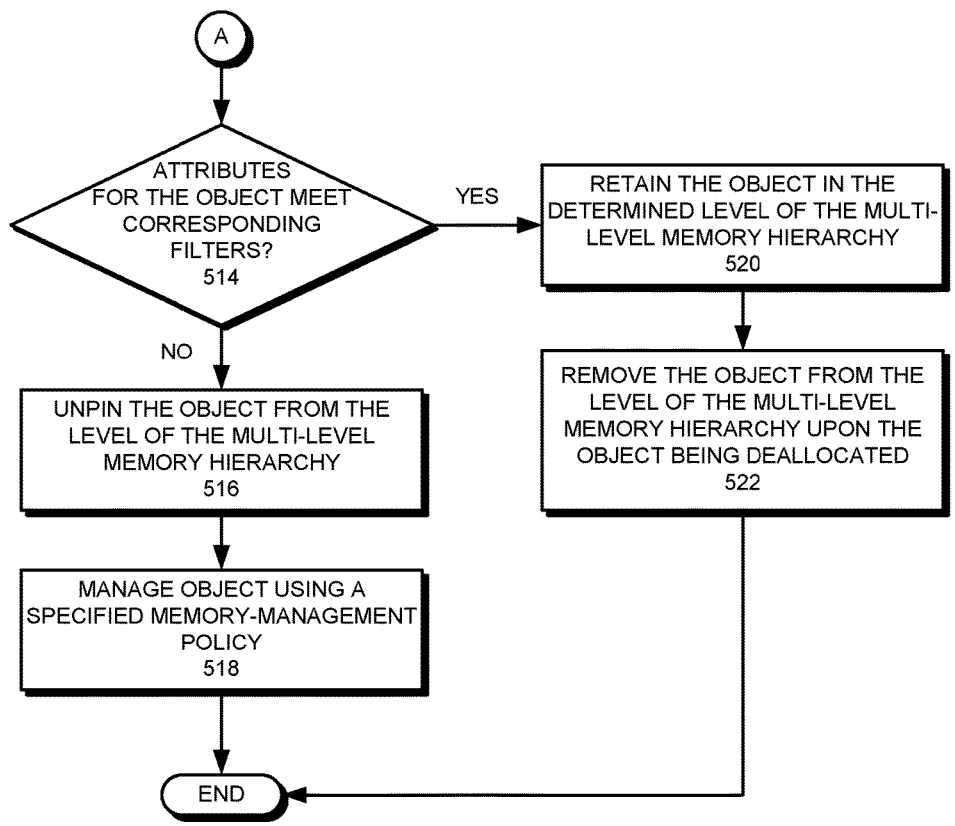
FIG. 5B presents a flowchart illustrating a process for soft pinning an object in a level of a multi-level memory hierarchy in accordance with some embodiments.

FIGS. 5A-5B present a flowchart illustrating a process for soft pinning an object in a level of a multi-level memory hierarchy in accordance with some embodiments. The operations shown in FIGS. 5A-5B are presented as a general example of operations performed by some embodiments. The operations performed by other embodiments include different operations and/or operations that are performed in a different order. Additionally, although certain mechanisms and entities are used in describing the operations (e.g., system runtime 200, etc.), in some embodiments, other mechanisms and entities may perform the operations. Also, references to a multi-level memory hierarchy in the following description refer to a multi-level memory hierarchy such as levels 114-120 of memory 104.

As shown in FIG. 5A, system runtime 200 first determines whether one or more attributes of an object (e.g., included in the object, associated with the object, relevant to the object, etc.) indicate that the object is to be pinned in the multi-level memory hierarchy (step 500). For example, in some embodiments, system runtime 200 may acquire, as an attribute, an annotation for the object that indicates that the object is to be pinned in the multi-level memory hierarchy. In these embodiments, the annotation can include one or more values (represented by, e.g., one or more bits) that indicate, to system runtime 200, that the object is to be pinned in the multi-level memory hierarchy. In some of these embodiments, the annotation is statically added to the object—such as when a developer adds an annotation to the object. As another example, one or more attributes associated with the object (and/or with the multi-level memory hierarchy, computer system 100, a software program that created the object etc.) may be acquired, generated, computed, determined, etc. by system runtime 200. For instance, an attribute representing a size of the object, an operating mode of computer system 100, an attribute representing a business and/or a size of one or more levels of memory, etc. may be acquired from corresponding hardware or software sources in computer system 100 and used as attribute(s) for determining whether the object is to be pinned in the multi-level memory hierarchy.

When an attribute is not present and/or does not indicate that the object is to be pinned in the multi-level memory hierarchy, system runtime 200 omits pinning of the object to a level of the multi-level memory hierarchy (step 502). In this case, the object is not retained in a particular level of the multi-level memory hierarchy, and system runtime (or another entity) may manage the object using a specified (e.g., default) memory-management policy for computer system 100 (step 504). For example, system runtime 200 and/or another entity may use an LMCAC policy to manage the object, along with other unpinned objects in memory 104.

When one or more attributes are present (or can be acquired, determined, etc.), system runtime 200 determines, based on the one or more attributes, that soft pinning is to be used for the object (step 506). For example, an annotation for the object and/or another acquired, determined, computed, etc. attribute may be used to directly or indirectly determine that the object is to be soft pinned in the multi-level memory hierarchy. For instance, a particular value in an annotation and/or one or more attributes exceeding corresponding filters may indicate to system runtime 200 that the object is to be soft pinned. (For the example in FIGS. 5A-5B, it is assumed that the attributes indicate that soft pinning is to be used for the object.)

System runtime 200 next determines, as part of determining whether one or more soft pinning filters are met, if one or more attributes associated with the object meet corresponding filters (e.g., filters 216) (step 508). For example, system runtime 200 can determine if one or more properties or characteristics of the object (e.g., size, type, etc.) meet corresponding filters. As another example, system runtime 200 can determine if one or more characteristics or properties of computer system 100 (e.g., operating mode, temperature, bandwidth of a memory bus, cache misses, arrangement of levels in the multi-level memory hierarchy, etc.) meet one or more corresponding filters. Generally, during this operation, system runtime 200 determines whether or not an object is to be initially soft pinned in the multi-level memory hierarchy based on one or more conditions, rules, etc. for the object itself, computer system 100 or some portion thereof, etc.

In some embodiments, system runtime 200 tracks runtime statistics for objects and/or computer system 100 using various hardware and software mechanisms, such as counters, registers, state machines, memory elements, etc. For example, system runtime 200 may keep track of runtime statistics for the objects with the memory usage, frequency of access, thermal effect, power consumption, and/or other performance measurements for the objects and/or computer system 100. In these embodiments, the runtime statistics are used separately or in combination for the above-described comparison with filters for soft pinning.

When the attributes associated with the object do not meet corresponding filters (e.g., if an object is deemed too large to be stored in a faster-access, but smaller level of memory, etc.) (step 508), system runtime 200 omits pinning of the object to a level of the multi-level memory hierarchy (step 502). In this case, the object may be stored in any level of the multi-level memory hierarchy, but is not retained in a particular level of the multi-level memory hierarchy, and system runtime (or another entity) may manage the object using a specified (e.g., default) memory-management policy for computer system 100 (step 504). For example, system runtime 200 and/or another entity may use an LMCAC policy to manage the object, along with other unpinned objects in memory 104.

Otherwise, when the attributes associated with the object meet corresponding filters (step 508), system runtime 200 determines a level of the multi-level memory hierarchy to which the object is to be pinned (step 510). For example, system runtime 200 may determine the level based on an annotation for the object. As another example, system runtime 200 may determine the level based at least in part on attributes other than an annotation, such as a size of the object, an operating mode of computer system 100, a business and/or a size of one or more levels of memory, etc. Generally, during operation 510, system runtime 200 determines, based on one or more factors, characteristics, properties, etc., of the object, computer system 100, etc. a level of the multi-level memory hierarchy in which the object is to be pinned.

System runtime 200 then soft pins the object to the determined level of the memory hierarchy (step 512). In the described embodiments, soft pinning the object includes storing the object in a location in the determined level of the multi-level memory hierarchy and then retaining the object in the level until: (a) the object no longer meets one or more filters or (b) the object is deallocated or otherwise removed from the multi-level memory hierarchy. In this way, for a lifetime of the object, unless the object stops meeting the pinning filters, the object is retained in the determined level of the multi-level memory hierarchy. The storing operation generally includes requesting allocation of or otherwise determining an available location in the determined level of the multi-level memory hierarchy (e.g., requesting allocation of one or more free contiguous or non-contiguous blocks of memory) and then storing the object in the available location. Retaining the object generally includes providing access to the object in the determined level of the multi-level memory hierarchy, but preventing the object from being moved to other levels of the multi-level memory hierarchy during the object's lifetime. For example, reads, modifications, writes, etc. of the object are permitted and performed normally on the object in the level of the multi-level memory hierarchy in which the object is pinned, but the object is not removed from the level of the multi-level memory hierarchy.

While the object is stored in the determined level of the multi-level memory hierarchy, system runtime 200 tracks runtime statistics for objects and/or computer system 100 using various mechanisms, such as counters, registers, state machines, memory elements, etc. For example, system runtime 200 may keep track of runtime statistics for the objects with the memory usage, frequency of access, thermal effect, power consumption, and/or other performance measurements for the object and/or computer system 100. In these embodiments, the runtime statistics are used separately or in combination for the above-described comparison with filters for soft pinning.

Proceeding now to FIG. 5B, system runtime 200 next determines if the soft pinned object is to be retained in the level of the multi-level memory hierarchy. More specifically, system runtime 200 determines if one or more attributes associated with the object meet corresponding filters (e.g., filters 216) (step 514). For example, system runtime 200 can determine if one or more properties or characteristics of the object (size, type, etc.) meet corresponding filters. As another example, system runtime 200 can determine if one or more characteristics or properties of computer system 100 (operating mode, temperature, bandwidth of a memory bus, cache misses, arrangement of levels in the multi-level memory hierarchy, etc.) meet one or more corresponding filters. Generally, during this operation, system runtime 200 determines whether or not an object that has already been soft pinned in a level of the multi-level memory hierarchy is to remain soft pinned in the multi-level memory hierarchy based on one or more conditions, rules, etc. for the object itself, computer system 100 or some portion thereof, etc.

When the attributes associated with the object do not meet the corresponding filters (step 514), system runtime 200 unpins the object from the level of the multi-level memory hierarchy (step 516). As described above, when unpinning an object, system runtime 200 does not necessarily remove the object from the level of the memory, but simply stops protecting the object in the level of the multi-level memory hierarchy, so that the object is no longer retained in the level of the multi-level memory hierarchy as a pinned object. In some embodiments, system runtime 200 (or another entity) manages the unpinned object using a specified (e.g., default) memory-management policy for computer system 100 (step 518). For example, system runtime 200 and/or another entity may use an LMCAC policy to manage the object, along with other unpinned objects in memory 104.

Otherwise, when the attributes associated with the object meet the corresponding filters (step 514), system runtime 200 retains the object in the determined level of the multi-level memory hierarchy (step 520).

In some embodiments, steps 514 and 520 (which are shown only being performed once in FIG. 5B) are performed more than once, and possibly repeatedly. For example, steps 514 and 520 may be performed periodically, when one or more predetermined events occur, etc. Generally, system runtime 200, while objects are soft pinned in one or more levels of the multi-level memory hierarchy may check one or more times to determine if the soft pinned objects should be retained in corresponding levels of the multi-level memory hierarchy (or not).

Upon determining that the object has been deallocated (or is otherwise to be removed from the multi-level memory hierarchy), system runtime 200 removes the object from the level of the multi-level memory hierarchy (step 522).

In some embodiments, a computer system (e.g., computer system 100 in FIG. 1 and/or some portion thereof) uses code and/or data stored on a computer-readable storage medium to perform some or all of the operations herein described. More specifically, the computer system reads the code and/or data from the computer-readable storage medium and executes the code and/or uses the data when performing the described operations.

A computer-readable storage medium can be any device or medium or combination thereof that stores code and/or data for use by a computer system. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, NVRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computer system 100 and/or some portion thereof) is stored on a non-transitory computer-readable storage medium that includes a database or other data structure which can be read by a computer system and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for handling objects in a computer system having a multi-level memory hierarchy with two or more levels of memory, each level being one of two or more types of memory, the method comprising:
by a system runtime:
identifying an object to be stored in the multi-level memory hierarchy;
determining, based on one or more attributes of the object, that the object is to be pinned in a level of the multi-level memory hierarchy, the determining comprising:
determining, as the level of the multi-level memory hierarchy, a particular level from among the two or more levels of memory in the multi-level memory hierarchy into which the object is to be pinned; and
pinning the object in the level of the multi-level memory hierarchy, wherein the object, when pinned in the level of the multi-level memory hierarchy, is excluded from a specified memory-management policy in the computer system.

2. The method of claim 1, wherein pinning the object in the level of the multi-level memory hierarchy comprises:
determining, based on one or more attributes of the object, that the object is to be soft pinned in the level of the multi-level memory hierarchy; and
soft pinning the object in the level of the multi-level memory hierarchy, the soft pinning comprising:
storing the object in the level of the multi-level memory hierarchy; and
retaining the object in the level of the multi-level memory hierarchy until one of:
one or more attributes of the object no longer meet one or more filters; or
the object has been deallocated or otherwise removed from the multi-level memory hierarchy.

3. The method of claim 2, wherein retaining the object in the level of the multi-level memory hierarchy until one or more attributes of the object no longer meet one or more filters comprises:
determining an updated value for one or more attributes of the object;
determining, based on the updated value, that the object is to be unpinned from the level of the multi-level memory hierarchy, the determining comprising comparing the updated value to the one or more filters; and
unpinning the object from the level of the multi-level memory hierarchy.

4. The method of claim 3, wherein the one or more attributes of the object comprise:
a frequency of memory access of the object; and
a size of the object.

5. The method of claim 1, wherein pinning the object in the level of the multi-level memory hierarchy comprises:
determining, based on one or more attributes of the object, that the object is to be hard pinned in the level of the multi-level memory hierarchy; and
hard pinning the object in the level of the multi-level memory hierarchy, the hard pinning comprising:
storing the object in the level of the multi-level memory hierarchy; and
retaining the object in the level of the multi-level memory hierarchy until the object has been deallocated or otherwise removed from the multi-level memory hierarchy.

6. The method of claim 1, further comprising:
determining, based on one or more attributes of the object, that the object is not to be pinned in a level of the multi-level memory hierarchy;
omitting pinning of the object within the multi-level memory hierarchy; and
managing the object using a specified memory-management policy.

7. The method of claim 1, further comprising:
determining at least one of the one or more attributes based on one or more performance measurements, the performance measurements being of one or more of properties of the object or properties of the computer system.

8. The method of claim 1, further comprising:
obtaining, as one of the one or more attributes of the object, an annotation for the object, the annotation statically or dynamically associated with the object.

9. The method of claim 1, wherein pinning the object in the level of the multi-level memory hierarchy comprises:
retaining the object in the level of the multi-level memory hierarchy until one or more conditions are met.

10. The method of claim 1, wherein when being excluded from the specified memory-management policy, the object is not considered a candidate for removal from the level of the multi-level memory hierarchy under the specified memory-management policy.

11. A computer system, comprising:
a multi-level memory hierarchy comprising:
a first level of memory of a first type of memory; and
a second level of memory of a second type of memory, the first type of memory being different than the second type of memory; and
a system runtime;
wherein the system runtime and the multi-level memory hierarchy are configured to:
identify an object to be stored in the multi-level memory hierarchy;

determine, based on one or more attributes of the object, that the object is to be pinned in a level of the multi-level memory hierarchy, the determining comprising:
  determining, as the level of the multi-level memory hierarchy, a particular level from among the two or more levels of memory in the multi-level memory hierarchy into which the object is to be pinned; and
pin the object in the level of the multi-level memory hierarchy, wherein the object, when pinned in the level of the multi-level memory hierarchy, is excluded from a specified memory-management policy in the computer system.

12. The computer system of claim 11, wherein pinning the object in the level of the multi-level memory hierarchy comprises:
  determining, based on one or more attributes of the object, that the object is to be soft pinned in the level of the multi-level memory hierarchy; and
  soft pinning the object in the level of the multi-level memory hierarchy, the soft pinning comprising:
    storing the object in the level of the multi-level memory hierarchy; and
    retaining the object in the level of the multi-level memory hierarchy until one of:
      one or more attributes of the object no longer meet one or more filters; or
      the object has been deallocated or otherwise removed from the multi-level memory hierarchy.

13. The computer system of claim 12, wherein retaining the object in the level of the multi-level memory hierarchy until one or more attributes of the object no longer meet a filter comprises:
  determining an updated value for one or more attributes of the object;
  determining, based on the updated value, that the object is to be unpinned from the level of the multi-level memory hierarchy, the determining comprising comparing the updated value to the one or more filters; and
  unpinning the object from the level of the multi-level memory hierarchy.

14. The computer system of claim 11, wherein pinning the object in the level of the multi-level memory hierarchy comprises:
  determining, based on one or more attributes of the object, that the object is to be hard pinned in the level of the multi-level memory hierarchy; and
  hard pinning the object in the level of the multi-level memory hierarchy, the hard pinning comprising:
    storing the object in the level of the multi-level memory hierarchy; and
    retaining the object in the level of the multi-level memory hierarchy until the object has been deallocated or otherwise removed from the multi-level memory hierarchy.

15. The computer system of claim 11, wherein the system runtime and the multi-level memory hierarchy are further configured to:
  determine, based on one or more attributes of the object, that the object is not to be pinned in a level of the multi-level memory hierarchy;
  omit pinning of the object within the multi-level memory hierarchy; and
  manage the object using a specified memory-management policy.

16. The computer system of claim 11, wherein the system runtime and the multi-level memory hierarchy are further configured to:
  obtain, as one of the one or more attributes of the object, an annotation for the object, the annotation statically or dynamically associated with the object.

17. A non-transitory computer-readable storage medium storing instructions that, when executed by a processor in a computer system having a multi-level memory hierarchy with two or more levels of memory, each level being one of two or more types of memory, cause the computer system to perform method for handling objects in the multi-level memory hierarchy, the method comprising:
  identifying an object to be stored in the multi-level memory hierarchy;
  determining, based on one or more attributes of the object, that the object is to be pinned in a level of the multi-level memory hierarchy, the determining comprising:
    determining, as the level of the multi-level memory hierarchy, a particular level from among the two or more levels of memory in the multi-level memory hierarchy into which the object is to be pinned; and
  pinning the object in the level of the multi-level memory hierarchy, wherein the object, when pinned in the level of the multi-level memory hierarchy, is excluded from a specified memory-management policy in the computer system.

18. The non-transitory computer-readable storage medium of claim 17, wherein pinning the object in the level of the multi-level memory hierarchy comprises:
  determining, based on one or more attributes of the object, that the object is to be soft pinned in the level of the multi-level memory hierarchy; and
  soft pinning the object in the level of the multi-level memory hierarchy, the soft pinning comprising:
    storing the object in the level of the multi-level memory hierarchy; and
    retaining the object in the level of the multi-level memory hierarchy until one of:
      one or more attributes of the object no longer meet one or more filters; or
      the object has been deallocated or otherwise removed from the multi-level memory hierarchy.

19. The non-transitory computer-readable storage medium of claim 17, wherein pinning the object in the level of the multi-level memory hierarchy comprises:
  determining, based on one or more attributes of the object, that the object is to be hard pinned in the level of the multi-level memory hierarchy; and
  hard pinning the object in the level of the multi-level memory hierarchy, the hard pinning comprising:
    storing the object in the level of the multi-level memory hierarchy; and
    retaining the object in the level of the multi-level memory hierarchy until the object has been deallocated or otherwise removed from the multi-level memory hierarchy.

20. The non-transitory computer-readable storage medium of claim 17, further comprising:
  determining, based on one or more attributes of the object, that the object is not to be pinned in a level of the multi-level memory hierarchy;
  omitting pinning of the object within the multi-level memory hierarchy; and managing the object using a specified memory-management policy.

* * * * *